United States Patent
Stockdale

(10) Patent No.: US 8,455,836 B2
(45) Date of Patent: Jun. 4, 2013

(54) SENSOR SYSTEM FOR CONSTANTLY MONITORING AN IRRADIANCE LEVEL OF A UV LAMP AND FOR BEING OPERATED BY POWER FROM A SENSOR THEREOF

(76) Inventor: Roy Stockdale, Hauppauge, NY (US)

( * ) Notice: Subject to any disclaimer, the term of this patent is extended or adjusted under 35 U.S.C. 154(b) by 708 days.

(21) Appl. No.: 12/589,721

(22) Filed: Oct. 28, 2009

(65) Prior Publication Data

US 2011/0095196 A1    Apr. 28, 2011

(51) Int. Cl.
*G01J 1/42*    (2006.01)

(52) U.S. Cl.
USPC .......................................................... 250/372

(58) Field of Classification Search
USPC .......................................................... 250/372
See application file for complete search history.

(56) References Cited

U.S. PATENT DOCUMENTS

| | | | |
|---|---|---|---|
| 4,204,956 A | 5/1980 | Flatow | |
| 5,401,394 A | 3/1995 | Markham | |
| 5,773,833 A * | 6/1998 | Hsi | 250/382 |
| 6,144,175 A | 11/2000 | Parra | |
| 6,316,877 B1 | 11/2001 | Kaas | |
| 6,429,438 B1 * | 8/2002 | Smestad | 250/373 |
| 6,819,060 B2 * | 11/2004 | Readio et al. | 315/291 |
| 2005/0274965 A1 | 12/2005 | Phillips et al. | |

* cited by examiner

Primary Examiner — Casey Bryant

(57) ABSTRACT

A sensor system that constantly monitors an irradiance level of a UV lamp and is operated by power from a sensor thereof, wherein the UV lamp is powered by a ballast. The sensor system includes a current sensor, a UV sensor, a voltage comparator, and a display. The current sensor is disposed in the electronic assembly and picks-up current from the ballast, and in response thereto, powers the voltage comparator. The UV sensor is disposed externally to the assembly and picks-up the irradiance from the UV lamp. The voltage comparator is disposed in the electronic assembly, is in electronic communication with the current sensor and the UV sensor, is powered by the current sensor, and compares voltage from the UV sensor to a predetermined value. The display is visible from the electronic assembly, is in electronic communication with the voltage comparator, and indicates result of comparison of the voltage comparator to thereby determine status of the UV lamp.

11 Claims, 1 Drawing Sheet

Figure 1:
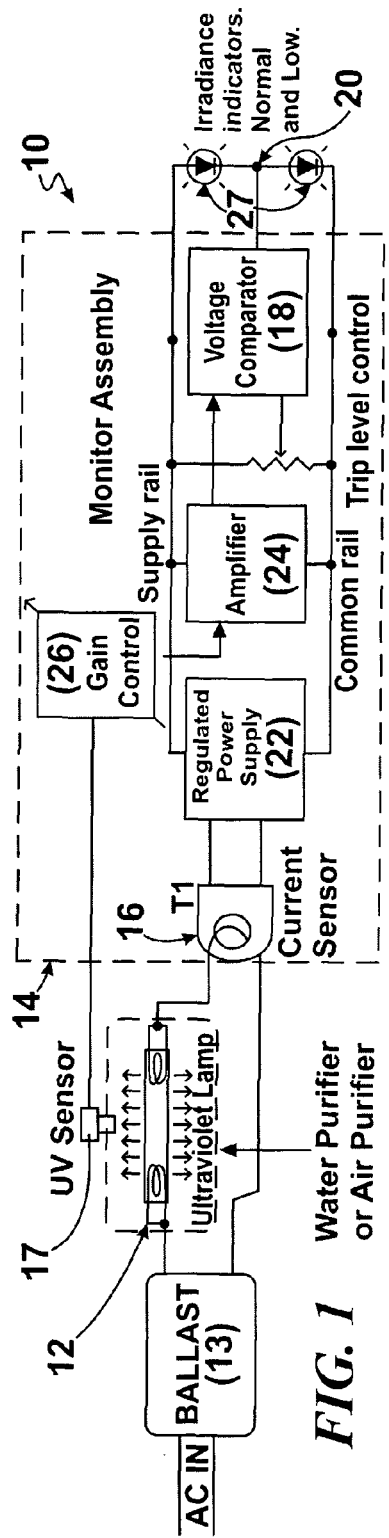

SENSOR SYSTEM FOR CONSTANTLY MONITORING AN IRRADIANCE LEVEL OF A UV LAMP AND FOR BEING OPERATED BY POWER FROM A SENSOR THEREOF

1. BACKGROUND OF THE INVENTION

A. Field of the Invention

The embodiments of the present invention relate to a monitor for indicating operability of a UV lamp, and more particularly, the embodiments of the present invention relate to a sensor system for constantly monitoring an irradiance level of a UV lamp and for being operated by power from a sensor thereof.

B. Description of the Prior Art

It is common practice to use a current sensor to drive an LED from lamp current in a ballast output lead that has been wired through the toroid of the sensor.

Numerous innovations for UV-related devices have been provided in the prior art, which will be described below in chronological order to show advancement in the art. Even though these innovations may be suitable for the specific individual purposes to which they address, however, they differ from the embodiments of the present invention in that they do not teach a sensor system for constantly monitoring an irradiance level of a UV lamp and for being operated by power from a sensor thereof.

(1) U.S. Pat. No. 4,204,956 to Flatow.

U.S. Pat. No. 4,204,956 issued to Flatow on May 27, 1980 teaches a system employing a plurality of particularly arraigned ultra-violet lamps emitting high intensity germicidal ultra-violet radiation and radiation producing ozone in a tank through which water is passed, with detectors monitoring lamp operation and ultra-violet radiation levels throughout the tank for purification of fluids passed through the tank.

(2) U.S. Pat. No. 5,401,394 to Markham.

U.S. Pat. No. 5,401,394 issued to Markham on Mar. 28, 1995 teaches a circuit for monitoring status of an ultraviolet (UV) light bulb in a water treatment system. The circuit uses either transformers or zener diodes with opto-isolators to monitor the voltage across the bulb. A logic signal is emitted when abnormally high voltage is detected, for example, indicating that the bulb is burned out, broken, or missing. A logic signal also is emitted when abnormally low voltage is detected, for example, indicating that the starter circuit is short circuited or that power is interrupted.

(3) U.S. Pat. No. 6,144,175 to Parra.

U.S. Pat. No. 6,144,175 issued to Parra on Nov. 7, 2000 teaches a low-voltage ballast-free energy-efficient ultra-violet material treatment and purification system and method having an ultraviolet (UV) source, which includes a gas discharge UV lamp having spaced electrodes, and a source of a low-voltage high-frequency alternating current square wave voltage and connected directly to the spaced electrodes to non-thermionically excite the gas discharge UV lamp. A flow sensor is used to proportionately control intensity of UV generation as a function of flow rate.

(4) U.S. Pat. No. 6,316,877 to Kaas.

U.S. Pat. No. 6,316,877 issued to Kaas on Nov. 13, 2001 teaches a lamp device including a UV intermediate pressure lamp tube arranged in an outer globe mounted in a socket. Sealing apparatus encloses the outer globe in order to ensure a mutual vacuum-tight mounting of the socket and the outer globe. The lamp device is suitable for application in a UV system for photochemical water purification. A control system includes a device for temperature measurement of an inactive gas in the outer globe and a device for regulating the tube voltage of the lamp tube. Controlling the tube voltage of the lamp tube increases service life of the lamp and ensures uniformity in the electromagnetic radiation (UV light) emitted by the lamp. The UV lamp is replaceable in the remaining part of the lamp device.

(5) U.S. Pat. No. 6,819,060 to Readio et al.

U.S. Pat. No. 6,819,060 issued to Readio et al. on Nov. 16, 2004 teaches a system and method for mitigating the effects of low power line voltage that can otherwise cause premature lamp mortality. A monitor circuit is provided for monitoring power characteristics relating to UV and/or fluorescent lamp operation, such as the lamp supply voltage or the current traversing the lamp. A controller operates in conjunction with the monitor circuit. The controller receives a signal indicative of the state of the monitored power characteristics and temporarily interrupts the power to the lamp when the signal indicates that the power source is currently failing to maintain a stable current flow through the lamp. Power is therefore removed from the lamp during periods of brownout or other low voltage conditions to prevent accelerated lamp mortality.

(6) United States Patent Application Publication Number 20050274965 to Phillips et al.

United States Patent Application Publication Number 20050274965 published to Phillips et al. on Dec. 15, 2005 teaches a method, system, and device for sterilizing a medium, such as gas or liquid, by arranging light sources in relation to a container containing the medium, and by then generating ultraviolet (UV) radiation for destroying bacteria or other microorganisms in the medium. The microorganisms are, preferably, destroyed by interacting with the UV radiation, thus damaging the DNA of the organisms and their ability to reproduce. The light sources, such as light emitting diodes, may be powered with a low voltage source as a primary power supply. The system or device include apparatus, such as a sleeve, for situating the LEDs with respect to the container.

It is apparent that numerous innovations for UV-related devices have been provided in the prior art, which are adapted to be used. Furthermore, even though these innovations may be suitable for the specific individual purposes to which they address, however, they would not be suitable for the purposes of the present invention as heretofore described, namely, a sensor system for constantly monitoring an irradiance level of a UV lamp and for being operated by power from a sensor thereof.

Thus, the prior art does not appear to teach using a current sensor as a power source for a complete UV monitor. Thus, there exists a need for a current sensor that is a transformer using a toroidally wound indicator to provide an output current from its coil that is proportional to the lamp current that is multiplied by the number of turns through the toroid and divided by the number of turns on the inductor.

2. SUMMARY OF THE INVENTION

Thus, it is an object of the embodiments of the present invention to provide a sensor system for constantly monitoring an irradiance level of a UV lamp and for being operated by power from a sensor thereof, which avoids the disadvantages of the prior art.

Briefly stated, another object of the embodiments of the present invention is to provide a sensor system that constantly monitors an irradiance level of a UV lamp and is operated by power from a sensor thereof, wherein the UV lamp is powered by a ballast. The sensor system includes an electronic assembly, a current sensor, a UV sensor, a voltage comparator, and a display. The current sensor is disposed in the electronic assembly and picks-up current from the ballast, and in response thereto, powers the voltage comparator. The UV sensor is disposed externally or internally to the electronic assembly and picks-up the irradiance from the UV lamp. The voltage comparator is disposed in the electrical assembly, is in electrical communication with the current sensor and the UV sensor, is powered by the current sensor, and compares voltage from the UV sensor to a predetermined value. The display is visible from the electronic assembly, is in electrical communication with the voltage comparator, and indicates result of comparison of the voltage comparator to thereby determine status of the UV lamp.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying drawings.

3. BRIEF DESCRIPTION OF THE DRAWINGS

Figure 2:
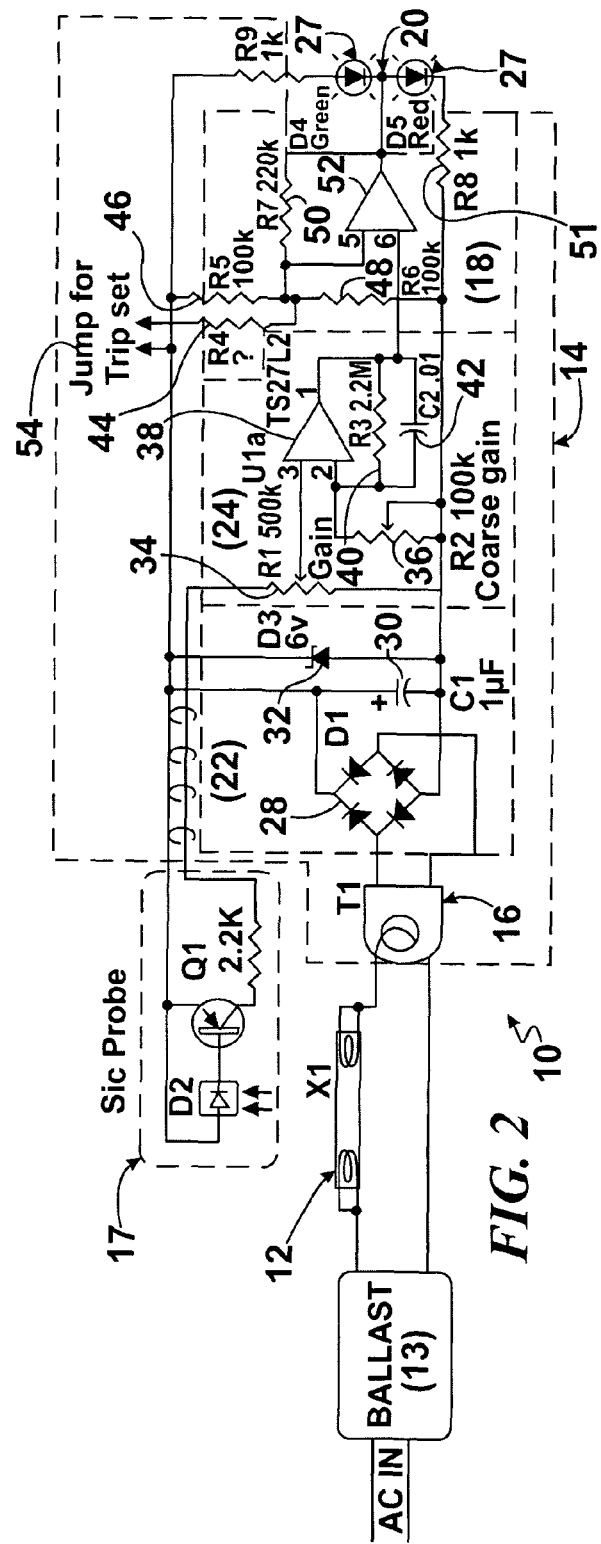

The figures of the drawings are briefly described as follows:

FIG. 1 is a diagrammatic block diagram of the sensor system of the embodiments of the present invention constantly monitoring an irradiance level of a UV lamp and being operated by power from a sensor thereof; and FIG. 2 is a diagrammatic schematic diagram of the sensor system of the embodiments of the present invention shown in FIG. 1.

4. DETAILED DESCRIPTION OF THE PREFERRED EMBODIMENTS

A. General

Referring now to the figures, in which like numerals indicate like parts, and particularly to FIGS. 1 and 2, which are, respectively, a diagrammatic block diagram of the sensor system of the embodiments of the present invention constantly monitoring an irradiance level of a UV lamp and being operated by power from a sensor thereof, and a diagrammatic schematic diagram of the sensor system of the embodiments of the present invention shown in FIG. 1, the sensor system of the embodiments of the present invention is shown generally at 10 for constantly monitoring an irradiance level of a UV lamp 12 and for being operated by power from a sensor thereof, wherein the UV lamp 12 is powered by a ballast 13.

B. The Overall Configuration of the Sensor System 10

The sensor system 10 comprises an electronic assembly 14, a current sensor 16, a UV sensor 17, a voltage comparator 18, and a display 20.

The current sensor 16 is disposed in the electrical assembly 14 and is for picking-up current from the ballast 13, and in response thereto, powers the voltage comparator 18.

The UV sensor 16 is disposed externally to the assembly 14 and is for picking-up irradiance from the UV lamp 12.

The voltage comparator 18 is disposed in the electronic assembly 14, is in electronic communication with the current sensor 16 and the UV sensor 17, is powered by the current sensor 16, and compares voltage from the UV sensor 17 to a predetermined value.

The display 20 is visible from the disclosed electronic assembly 14, is in electronic communication with the voltage comparator 18, and indicates result of comparison of the voltage comparator 18, to thereby determine status of the UV lamp 12.

The sensor system 10 further comprises a regulated power supply 22. The regulated power supply 22 is disposed in the electronic assembly 14 and is in electronic communication with, and is powered by, the current sensor 16.

The sensor system 10 further comprises an amplifier 24. The amplifier 24 is disposed in the electronic assembly 14, is in electronic communication with the regulated power supply 22 and the voltage comparator 18, is powered by the current sensor 16, and amplifies output of the UV sensor 17, and in response thereto, feeds the voltage comparator 18.

The sensor system 10 further comprises a gain control 26. The gain control 26 is accessible from the electronic assembly 14, is in electronic communication with the UV sensor 17 and the amplifier 24, and calibrates gain levels.

The display 20 comprises a pair of LEDs 27, preferably green and red, but is not limited to that, because the amplifier 24 can also be used to drive an LCD display to display the irradiance in microwatts/centimeter$^2$ or to display the irradiance as a relative percentage of an optimum level.

C. The Specific Configuration of the Regulated Power Supply 22

The specific configuration of the regulated power supply 22 can best be seen in FIG. 2, and as such, will be discussed with reference thereto.

The regulated power supply 22 shows a rectifier, which may be a bridge, a half wave or a multiplier 28, a capacitor 30, and a Zener diode 32.

(1) Example

The bridge 28 was constructed and tested with different loads using a ballast 13 delivering 300 mA lamp current, with the current sensor 16 on lead. The green LED 27 of the display 20 was clearly visible at all tested currents, though obviously best at the highest. When properly driving a 400 mA lamp 12, currents would obviously be 33% higher. This confirmed that a 6 volt Zener diode 32.

D. The Specific Configuration of the Amplifier 24

The specific configuration of the amplifier 24 can best be seen in FIG. 2, and as such, will be discussed with reference thereto.

The amplifier 24 comprises a first potentiometer 34, a second potentiometer 36, an amplifier 38, a resistor 40, and a capacitor 42.

The first potentiometer 34 and the second potentiometer 36 have values of 500 k and 100 k each.

E. The Specific Configuration of the Voltage Comparator 18

The specific configuration of the voltage comparator 18 can best be seen in FIG. 2, and as such, will be discussed with reference thereto.

The voltage comparator 18 comprises a first resistor 44, a second resistor 46, a third resistor 48, a fourth resistor 50, a fifth resistor 51, and an amplifier 52.

The fourth resistor 50 provides hysteresis. Without hysteresis there was an irradiance value that would allow both of the pair of LEDs 27 of the display 20 to be lit simultaneously.

The first resistor 44 is used during calibration to provide a differential between operating level and trip level.

(1) Example

A jumper 54 was connected to place the first resistor 44 in parallel with the second resistor 46 and gain was set so that the green LED 27 of the display 20 just lights. The jumper 54 was then removed, and in doing so, the required trip differential is applied to the system 10. Alternatively, the first resistor 44 could have two values and have an appropriate one thereof jumped to suit a purification level as required below.

(a) Drinking Water Purification.

A loss of 10% was allowed due to water quality and another 20% due to degradation of the UV lamp 12. This yielded a trip point that is 70% of set-up irradiance.

(b) Waste Water Purification.

A loss of 35% was allowed due to water quality and another 20% due to degradation of the UV lamp 12. This yielded a trip point that is 45% of set-up irradiance.

F. Impressions

It will be understood that each of the elements described above or two or more together may also find a useful application in other types of constructions differing from the types described above.

While the embodiments of the present invention have been illustrated and described as embodied in a sensor system for constantly monitoring an irradiance level of a UV lamp and for being operated by power from a sensor thereof, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features from the standpoint of prior art fairly constitute characteristics of the generic or specific aspects of the embodiments of the present invention.

The invention claimed is:

1. A sensor system for constantly monitoring an irradiance level of a UV lamp and for being operated by power from a sensor thereof, wherein the UV lamp is powered by a ballast, comprising:
   a) an electronic assembly;
   b) a current sensor;
   c) a UV sensor;
   d) a voltage comparator; and
   e) a display;
   wherein said current sensor is disposed on said assembly;
   wherein said current sensor is for picking-up current from said ballast, and in response thereto, powers said voltage comparator;
   wherein said UV sensor is for picking-up the irradiance from the UV lamp;
   wherein said voltage comparator is disposed in said electronic assembly;
   wherein said voltage comparator is in electronic communication with said current sensor;
   wherein said voltage comparator is in electronic communication with said UV sensor;
   wherein said voltage comparator is powered by said current sensor;
   wherein said voltage comparator compares voltage from said UV sensor to a predetermined value;
   wherein said display is in electronic communication with said voltage comparator; and
   wherein said display indicates result of comparison of said voltage comparator, to thereby determine status of the UV lamp.

2. The system of claim 1, further comprising a regulated power supply;
   wherein said regulated power supply is disposed in said electronic assembly;
   wherein said regulated power supply is in electronic communication with said current sensor; and
   wherein said regulated power supply is powered by said current sensor.

3. The system of claim 2, further comprising an amplifier;
   wherein said amplifier is disposed in said assembly;
   wherein said amplifier is in electronic communication with said regulated power supply;
   wherein said amplifier is in electronic communication with said voltage comparator;
   wherein said amplifier is powered by said current sensor; and
   wherein said amplifier amplifies the output of the UV sensor, and in response thereto, feeds said voltage comparator.

4. The system of claim 3, further comprising a gain control;
   wherein said gain control is accessible from said;
   wherein said gain control is in electronic communication with said UV sensor;
   wherein said gain control is in electronic communication with said amplifier; and
   wherein said gain control calibrates gain levels.

5. The system of claim 1, wherein said display is a pair of LEDs.

6. The system of claim 1, wherein said display is an LCD display to display the irradiance in microwatts/centimeter$^2$ or to display the irradiance as a relative percentage of an optimum level.

7. The system of claim 2, wherein said regulated power supply comprises:
   a) a bridge;
   b) a capacitor; and
   c) a Zener diode.

8. The system of claim 3, wherein said amplifier comprises:
   a) a first potentiometer;
   b) a second potentiometer;
   c) an amplifier;
   d) a resistor; and
   e) a capacitor.

9. The system of claim 1, wherein said voltage comparator comprises:
   a) a first resistor;
   b) a second resistor;
   c) a third resistor;
   d) a fourth resistor;
   e) a fifth resistor; and
   f) an amplifier.

10. The system of claim 9, wherein said fourth resistor of said voltage comparator provides hysteresis.

11. The system of claim 9, wherein said first resistor of said voltage comparator provides a differential between operating level and trip level.

\* \* \* \* \*